United States Patent
Ikeda (10) Patent No.: US 7,453,504 B2
(45) Date of Patent: Nov. 18, 2008

(54) SIGNAL PROCESSING METHOD AND APPARATUS, AND IMAGE SENSING APPARATUS

(75) Inventor: Eiichiro Ikeda, Kanagawa (JP)

(73) Assignee: Canon Kabuhsiki Kaisha, Tokyo (JP)

( * ) Notice: Subject to any disclaimer, the term of this patent is extended or adjusted under 35 U.S.C. 154(b) by 805 days.

(21) Appl. No.: 10/944,717

(22) Filed: Sep. 21, 2004

(65) Prior Publication Data
US 2005/0078224 A1    Apr. 14, 2005

(30) Foreign Application Priority Data
Sep. 30, 2003   (JP) .............................. 2003-341964

(51) Int. Cl.
*H04N 5/208* (2006.01)
*H04N 5/228* (2006.01)

(52) U.S. Cl. .................................. 348/252; 348/222.1

(58) Field of Classification Search ................ 348/252, 348/222.1
See application file for complete search history.

(56) References Cited

U.S. PATENT DOCUMENTS 5,170,249 A * 12/1992 Ohtsubo et al. .......... 348/222.1
5,767,899 A * 6/1998 Hieda et al. ............... 348/222.1
6,822,758 B1 * 11/2004 Morino ....................... 358/1.9
7,095,434 B1 * 8/2006 Ikeda ....................... 348/219.1
2003/0138162 A1 * 7/2003 Hirai ........................... 382/266
2003/0179299 A1 * 9/2003 Okada ..................... 348/222.1
2004/0091145 A1 * 5/2004 Kohashi et al. ............. 382/162

FOREIGN PATENT DOCUMENTS

JP          9-200785 0        7/1997
JP          2001-320722 A    11/2001

* cited by examiner

*Primary Examiner*—James M Hannett
(74) *Attorney, Agent, or Firm*—Fitzpatrick, Cella, Harper & Scinto (57) ABSTRACT

At least two high-frequency signals are generated using luminance signals of at least two color components contained in a video signal, and a high-frequency signal for edge emphasizing processing is generated from the at least two generated high-frequency signals based upon the size relationship between the at least two high-frequency signals. Edge emphasizing processing is applied to the luminance signals, which are obtained from the video signal, using the high-frequency signal for edge emphasizing processing thus generated.

11 Claims, 13 Drawing Sheets

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

| $Y_{1,1}$ | | | | $Y_{1,5}$ |
|---|---|---|---|---|
| | | | | |
| | | $Y_{3,3}$ | | |
| | | | | |
| $Y_{5,1}$ | | | | $Y_{5,5}$ |

SIGNAL PROCESSING METHOD AND APPARATUS, AND IMAGE SENSING APPARATUS

FIELD OF THE INVENTION

This invention relates to a signal processing method and apparatus well suited to a digital camera or video camera that uses an image sensing device.

BACKGROUND OF THE INVENTION

Figure 8:
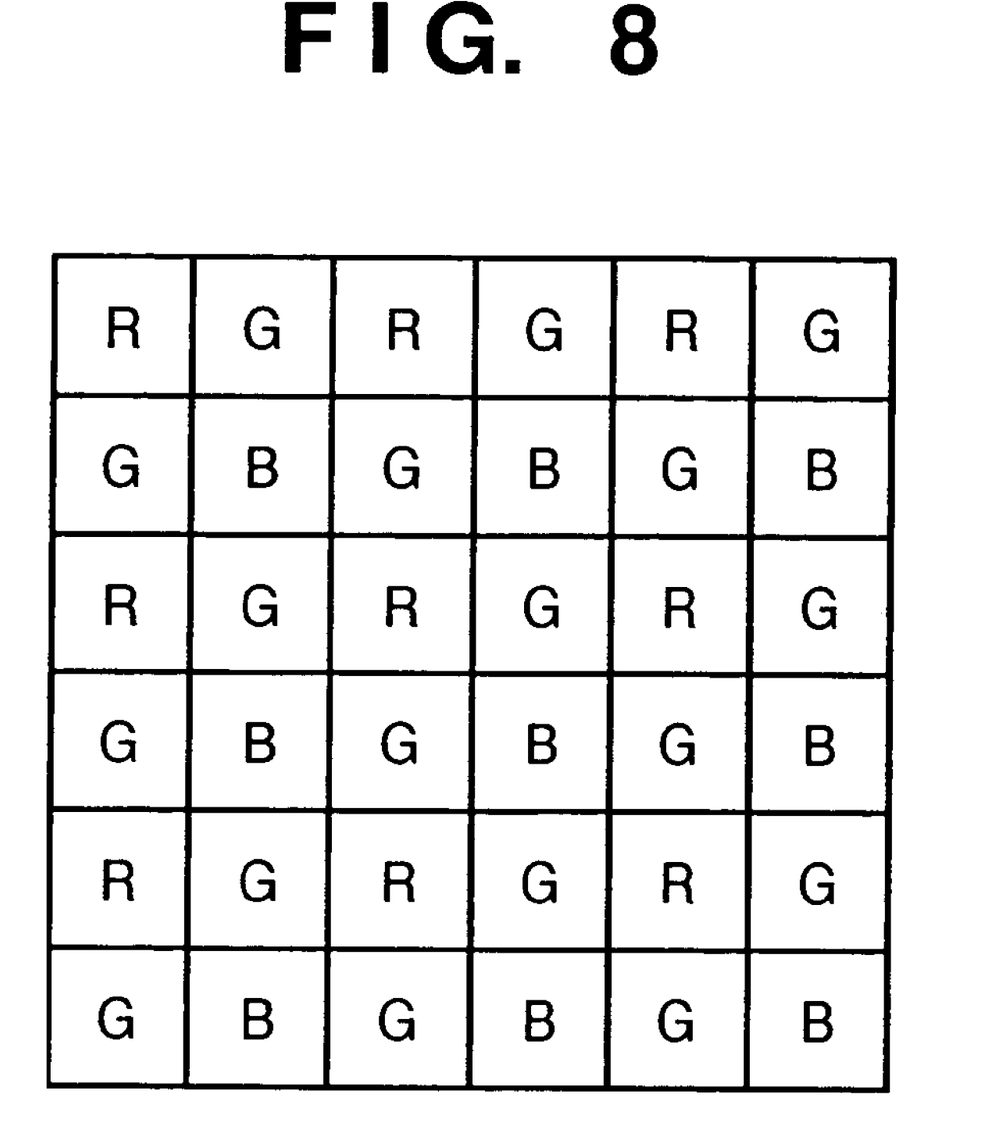
FIG. 8 is a diagram illustrating an example of a primary-colors filter array.
Figure 9:
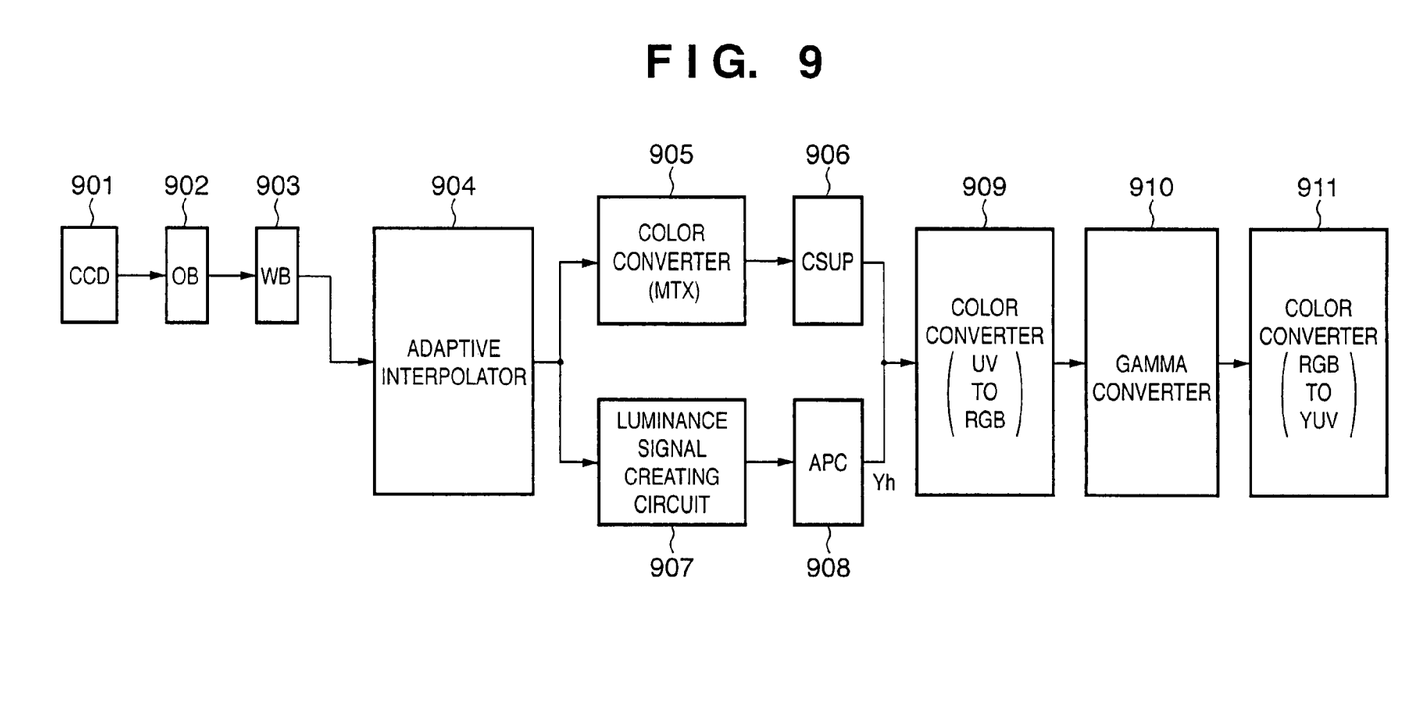
FIG. 9 is a block diagram illustrating the signal processing circuitry in an image sensing apparatus.

FIG. 9 is a block diagram illustrating the structure of an ordinary signal processing circuit in a single-chip image sensing apparatus having a primary-colors filter of the kind shown in FIG. 8. In this specification, red, green and blue signals will be abbreviated to R, G, B signals, respectively. An output signal from an image sensing device 901 is subjected to black balance and white balance adjustments in an OB circuit 902 and WB circuit 903, respectively. An adaptive interpolation circuit 904 performs adaptive interpolation processing for every color signal in such a manner that a signal will be present at all pixel positions. Generally, in case of a camera having a primary-colors checkered filter of the kind shown in FIG. 8, vertical or horizontal stripes are discriminated by detecting signal correlation above, below and to the left and right of a pixel to undergo interpolation. If a vertical stripe is discriminated, interpolation is performed from the upper and lower signals. If a horizontal stripe is discriminated, then interpolation is performed from the left and right pixels. Such adaptive interpolation is well known and the details thereof will not be described here.

The output of the adaptive interpolation circuit 904 is converted to color difference signals (R-Y, B-Y) by a color converting circuit 905, and false colors in the saturated region are removed by a CSUP (Chroma Suppress) circuit 906. Meanwhile, the output of the adaptive interpolation circuit 904 is converted to a luminance signal by a luminance signal creating circuit 907 and edge emphasis is applied by an edge emphasizing circuit (APC) 908. The color difference signals from the CSUP circuit 906 and an output signal Yh from the edge emphasizing circuit 908 are converted to an RGB signal by color converting circuit 909. A tone correction that conforms to the output apparatus is applied by a gamma circuit 910. The output signal of the gamma circuit 910 is converted to a YUV circuit by a color converting circuit 911.

Figure 10:
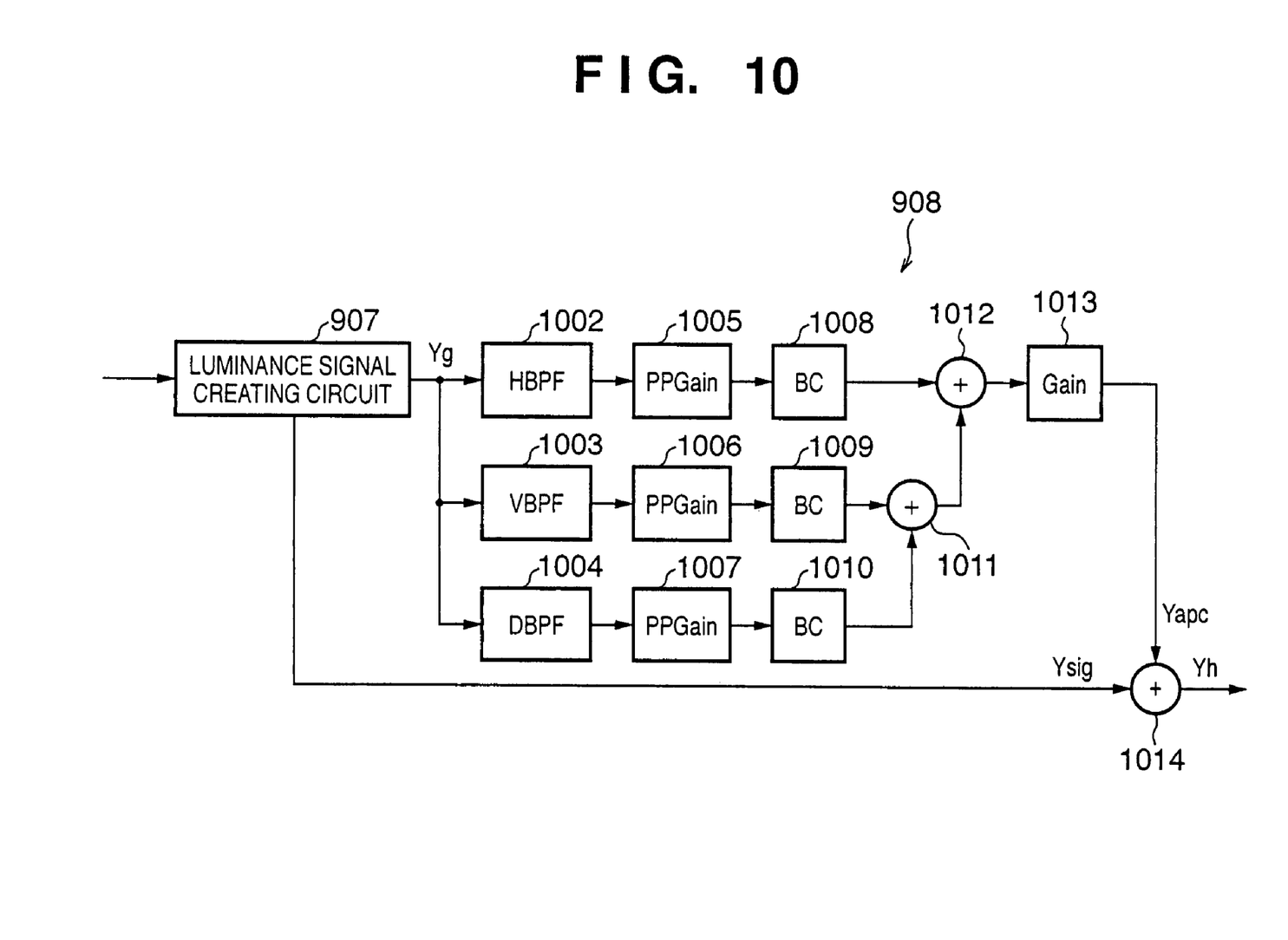
FIG. 10 is a block diagram illustrating the structure of an ordinary edge emphasizing circuit.

FIG. 10 is a block diagram illustrating the details of the edge emphasizing circuit 908 shown in FIG. 9. In the case of an image sensing apparatus equipped with a single-chip primary-colors checkered filter of the kind shown in FIG. 8, the frequency band of the RB signal is only half that of the G signal. In general, therefore, only the G signal is employed in high-frequency-signal detection used in edge emphasis.

The operation of the edge emphasizing circuit 908 will be described with reference to FIG. 10. A signal Yg obtained by adaptive interpolation in the adaptive interpolation circuit 904 using the G signal is supplied from the luminance signal creating circuit 907 to bandpass filter circuits 1002 to 1004. The bandpass filter circuit 1002 for detecting high-frequency components in the horizontal direction (HBPF) detects an edge in the horizontal direction from Yg and outputs this as an edge signal. The edge signal is subjected to amplitude adjustment in a PP gain (peak-to-peak correct gain) circuit 1005, and noise components are removed by a BC (base Clip) circuit 1008. Similarly, edge signals in the vertical direction (VBPF) and diagonal direction (DBPF) also are detected. The edge signals are added by adders 1011, 1012 and a gain adjustment is applied in a gain circuit 1013 to obtain a signal Yapc.

Meanwhile, the luminance signal creating circuit 907 generates a main luminance signal Ysig using Yr (R signal), Yg (G signal) and Yb (B signal) obtained by adaptive interpolation in the adaptive interpolation circuit 904. The main luminance signal Ysig is calculated in accordance with the following equation:

$$Ysig = 0.3 \times Yr + 0.59 \times Yg + 0.11 \times Yb \qquad (1)$$

Finally, the main luminance signal (Ysig) and the output signal (Yapc) from the gain circuit are added by an adder 1014 and the sum is output as Yh.

Figure 11:
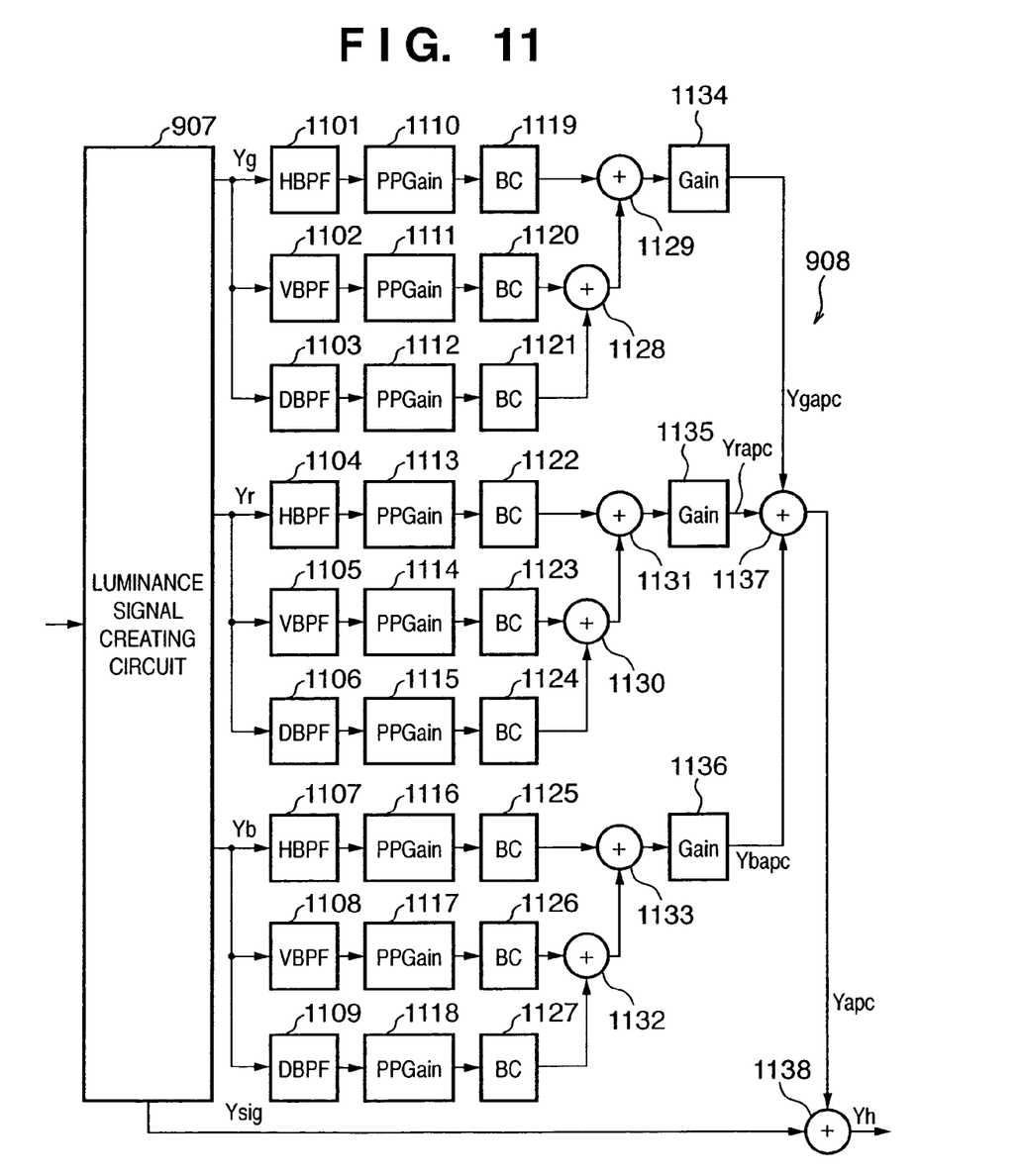
FIG. 11 is a block diagram illustrating the structure of another ordinary edge emphasizing circuit.

FIG. 11 illustrates one more prior-art example of the edge emphasizing circuit 908 shown in FIG. 9. In this example, R and B signals and not just the G signal are used as edge detection signals. The Yg signal (G signal) obtained by adaptive interpolation in the adaptive interpolation circuit 904 is input to bandpass filters 1101 to 1103 via the luminance signal creating circuit 907. A bandpass filter circuit 1104 for detecting high-frequency components in the horizontal direction (HBPF) detects an edge signal in the horizontal direction of Yg. The edge signal is subjected to amplitude adjustment in a PP gain circuit 1113 and noise components are removed by a BC circuit 1122. Similarly, edge signals in the vertical direction (VBPF) and diagonal direction (DBPF) of Yg also are detected. The edge signals are added by adders 1130, 1131 and a gain adjustment is applied in a gain circuit 1134 to obtain a signal Ygapc.

Further, Yr (R signal) and Yb (B signal) that are output from the adaptive interpolation circuit 904 also are subjected to similar processing to obtain edge signals Yrapc, Ybapc, respectively The Ygapc, Yrapc, Ybapc signals are added by an adder 1137 to obtain edge signal Yapc. An adder 1138 adds the edge signal Yapc and the main luminance signal Ysig [see Equation (1) above), which has been generated by the luminance signal creating circuit 907, and outputs the result.

Figure 12:
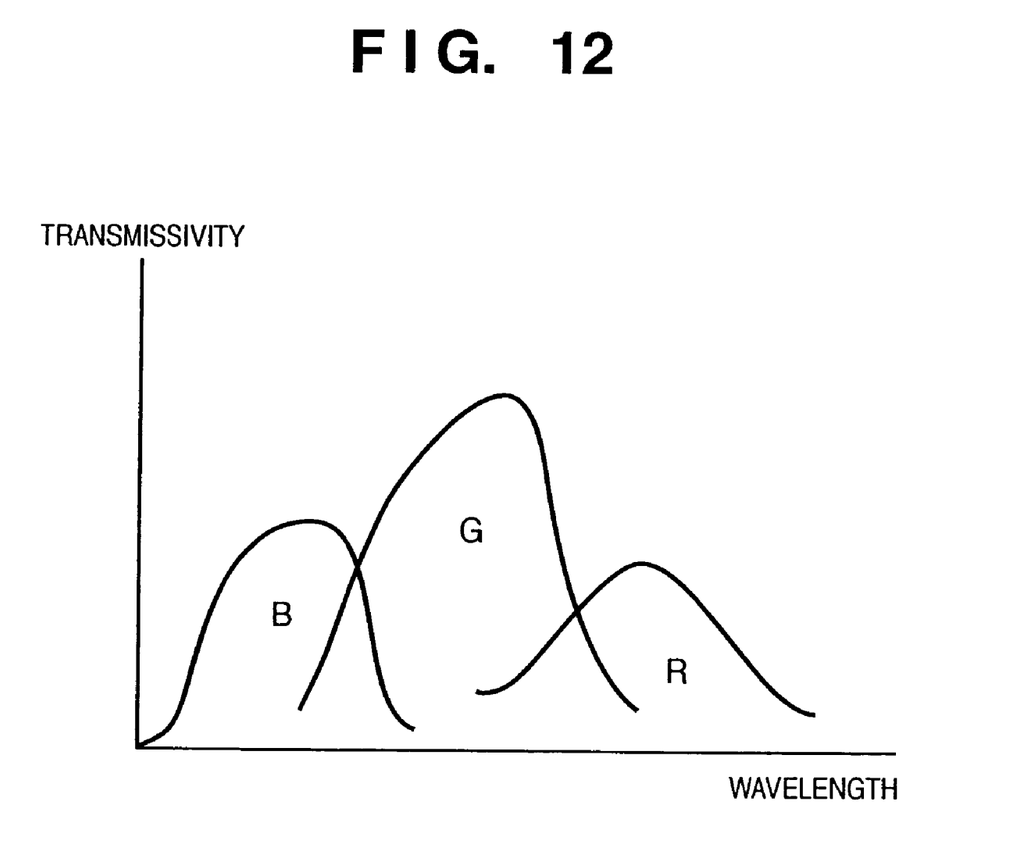
FIG. 12 is a diagram useful in describing the spectral sensitivity distribution of a primary-colors filter.

With the example of the prior art shown in FIG. 10, however, only the G signal is used in edge detection. Consequently, a problem which arises is that a subject whose color possesses no spectral sensitivity to G (the green component) will appear significantly indistinct. (A boundary portion when a subject having the colors red and black is imaged is referred to as a "red-black edge" below.) Further, in the example of FIG. 11, edge signals detected from an RGB signal are further included irrespective of the color of the subject. Consequently, with the edge emphasizing processing shown in FIG. 11, a subject of the color green, for example, appears significantly indistinct in comparison with edge emphasis from the G signal alone (the edge emphasis processing of FIG. 10). Furthermore, as shown in FIG. 12, the R, B Spectral sensitivity of a primary-colors image sensing device currently in use generally is fairly low in comparison with that of the G signal, as shown in FIG. 12. The R and B signals, therefore, are raised in gain by white balance gain and noise components also are enlarged. As a result, the edge emphasis signals obtained from the R and B signals include many noise components. Though blurring of the red-black edge is improved upon in comparison with the prior-art example of FIG. 10, noise increases and image quality declines.

SUMMARY OF THE INVENTION

Accordingly, an object of the present invention is to make possible excellent edge emphasis irrespective of the color of the subject.

According to the present invention, the foregoing object is attained by providing a signal processing apparatus comprising: a first generating unit configured to generate at least two high-frequency signals using luminance signals of at least two color components in a video signal; a second generating configured to generate a high-frequency signal for edge emphasizing processing from the at least two high-frequency signals based upon a size relationship between the at least two high-frequency signals generated by the first generating means; and an edge emphasizing unit configured to execute edge emphasizing processing of the luminance signals, which are obtained from the video signal, using the high-frequency signal for edge emphasizing processing.

According to another aspect of the present invention, the foregoing object is attained by providing a signal processing apparatus comprising: a deciding unit configured to decide, in pixel units and on the basis of luminance signals of a plurality of color components in a video signal, a mixing ratio of a plurality of luminance signals conforming to the plurality of color components; a first generating unit configured to calculate the weighted mean of the plurality of luminance signals in pixel units in accordance with the mixing ratio, and generating a combined luminance signal; and a second generating unit configured to generate a high-frequency signal for edge emphasis using the combined luminance signal.

Further, according to the present invention, there is provided a signal processing method corresponding to the signal processing apparatus described above. Further, according to the present invention, there is provided an image sensing apparatus that uses the above-described signal processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail with reference to the accompanying drawings.

First Embodiment

In a first embodiment, the edge signal Ygapc detected from the Yg signal obtained by adaptive interpolation of the G signal in a sensed image signal and the edge signal Yrapc detected from the Yr signal obtained by adaptive interpolation of the R signal in the sensed image signal are compared and the weighted mean of Ygapc and Yrapc is calculated using a difference signal DiffApc indicative of the difference between the absolute values of the compared signals. By virtue of this arrangement, the edge signal detected from the G signal is compensated for by the edge signal detected from the R signal to avoid blurring of the red-black edge, which is a problem encountered in a prior-art edge emphasizing circuit that uses only the G signal, by way of example.

The structure and the flow of processing of a signal processing circuit in an image sensing apparatus according to the first embodiment are as already described above in conjunction with FIG. 9 and need not be described again.

Figure 1:
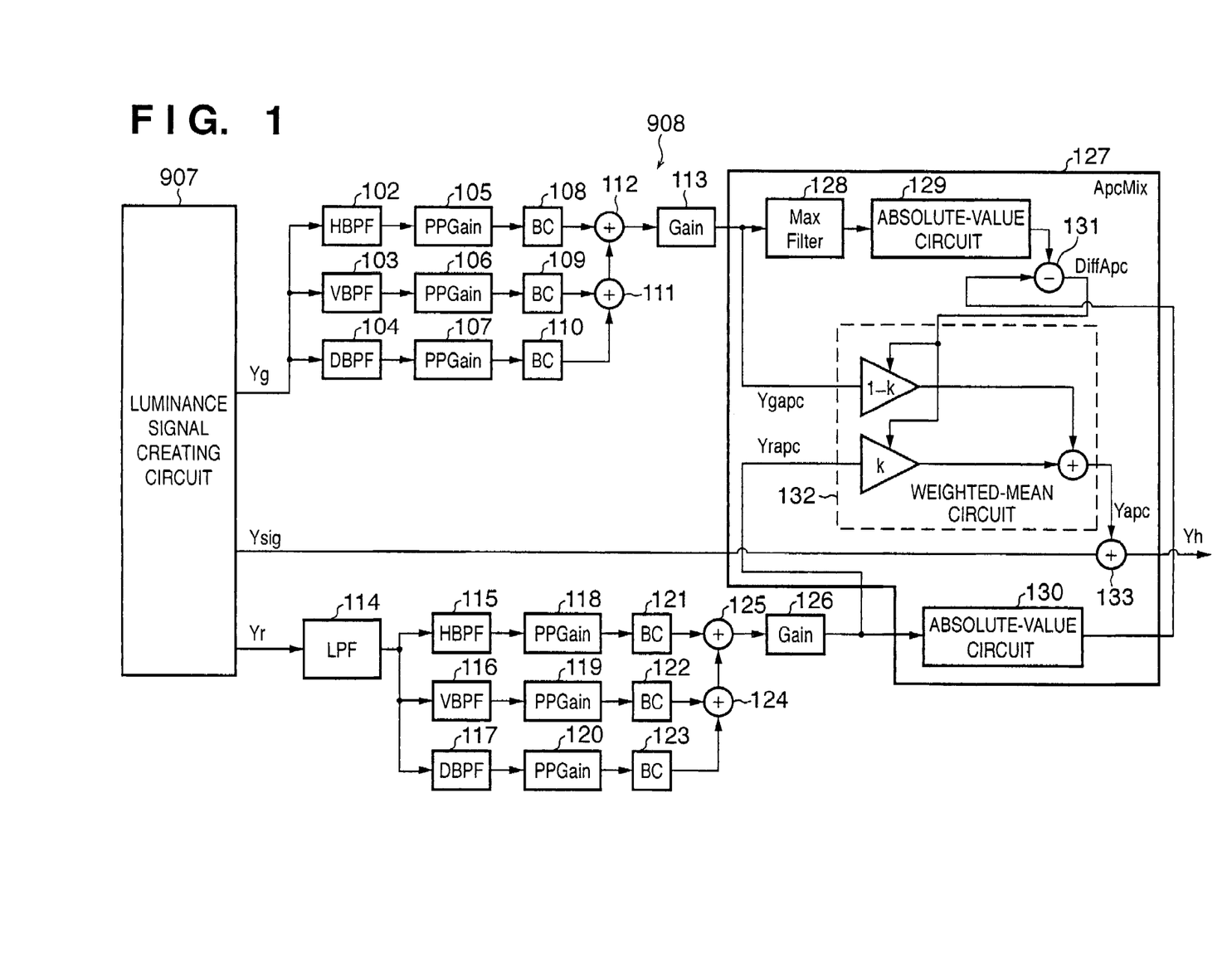
FIG. 1 is a block diagram illustrating the structure of an edge emphasizing circuit according to a first embodiment of the present invention.

FIG. 1 is a block diagram illustrating the structure of the edge emphasizing circuit 908 according to the first embodiment. Operation will be described in accordance with FIG. 1. The luminance signal creating circuit 907 outputs the Yg signal (the signal obtained by adaptive interpolation of the G signal) and the Yr signal (the signal obtained by adaptive interpolation of the R signal). A high-frequency edge signal in the horizontal direction is detected in the Yg signal by a bandpass filter circuit 102 for detecting high-frequency components in the horizontal direction (HBPF). The high-frequency edge signal undergoes amplitude adjustment in a PP gain circuit 105 and removal of noise components in a BC circuit 108, after which the resultant signal is output. Similarly, a high-frequency edge signal in the vertical direction is output by a bandpass filter circuit 103 in the vertical direction (VBPF), a PP gain circuit 106 and a BC circuit 109, and an edge signal in the diagonal direction (DBPF) is output by a bandpass filter circuit 104 in the diagonal direction (DBPF), a PP gain circuit 107 and a BC circuit 110. These edge signals are added by adders 111, 112, and the resultant signal is subjected to a gain adjustment in a gain circuit 113 and then is output as a first high-frequency edge signal Ygapc.

Meanwhile, an edge signal is also detected from the Yr signal (the signal obtained by adaptive interpolation of the R signal). First, the Yr signal is band-limited by an LPF circuit 114. This is because the R signal is such that the sampling Nyquist frequency is half that of the G signal. The edge signal in the horizontal direction is thenceforth detected by a bandpass filter circuit 115 for detecting high-frequency components in the horizontal direction (HBPF). The detected edge signal is subjected to amplitude adjustment by a PP gain circuit 118 and removal of noise components in a BC circuit 121, after which the resultant signal is output. Similarly, an edge signal in the vertical direction is output by a bandpass filter circuit 116 in the vertical direction (VBPF), a PP gain circuit 119 and a BC circuit 122, and an edge signal in the diagonal direction (DBPF) is output by a bandpass filter circuit 117 in the diagonal direction (DBPF), a PP gain circuit 120 and a BC circuit 123. These edge signals are added by adders 124, 125, and the resultant signal is subjected to a gain adjustment in a gain circuit 126 and then is output as a second high-frequency edge signal Yrapc.

Next, an ApcMix circuit 127 executes processing for combining the high-frequency edge signal Ygapc obtained from the Yg signal and the high-frequency edge signal Yrapc obtained from the Yr signal. The ApcMix circuit 127 is characterized in that it calculates the weighted mean of Ygapc and Yrapc using a difference signal indicative of the difference between the absolute values of these signals. The operation of the ApcMix circuit 127 will be described below.

Figure 13:
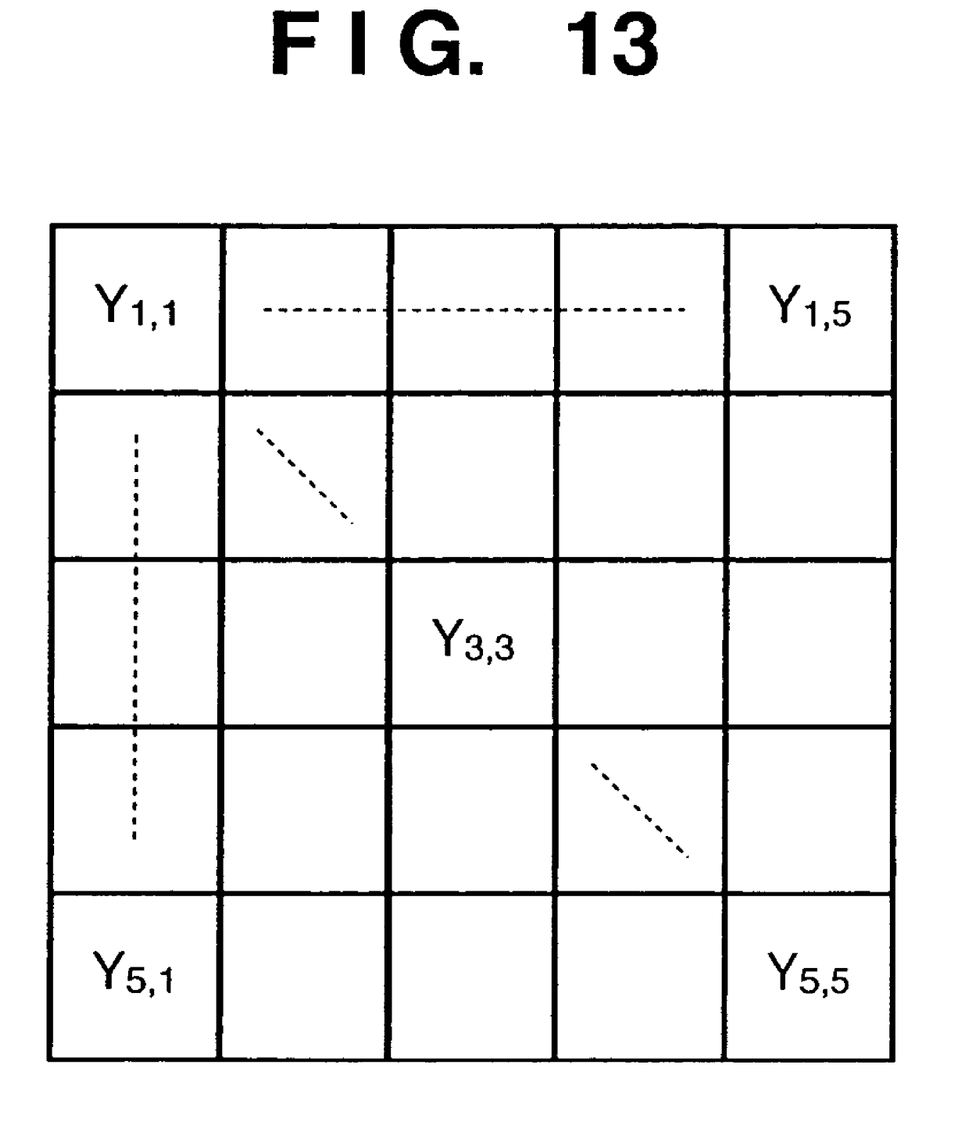
FIG. 13 is a diagram useful in describing the operation of a maximum-value filter.

The Ygapc signal is successively replaced with the maximum pixel values located in an n×n pixel area, the center of which is the pixel of interest, by a maximum-value filter 128. For example, in the case of a filter the target of which is a 5×5 pixel area, maximum values of $Y_{1,1}$ to $Y_{5,5}$ are output as values of a pixel $Y_{3,3}$ of interest, as illustrated in FIG. 13. Edge signal Yrapc that has been output from the maximum-value filter 128 and edge signal Ygapc that has been output from the gain circuit 126 are supplied to absolute-value circuits 129, 130, respectively, the outputs whereof are supplied to a subtractor 131. As a result, the subtractor 131 outputs a difference signal (DiffApc) between |Yrapc| and |Ygapc|, namely:

$$DiffApc = |Yrapc| - |Ygapc| \quad (2)$$

Figure 4:
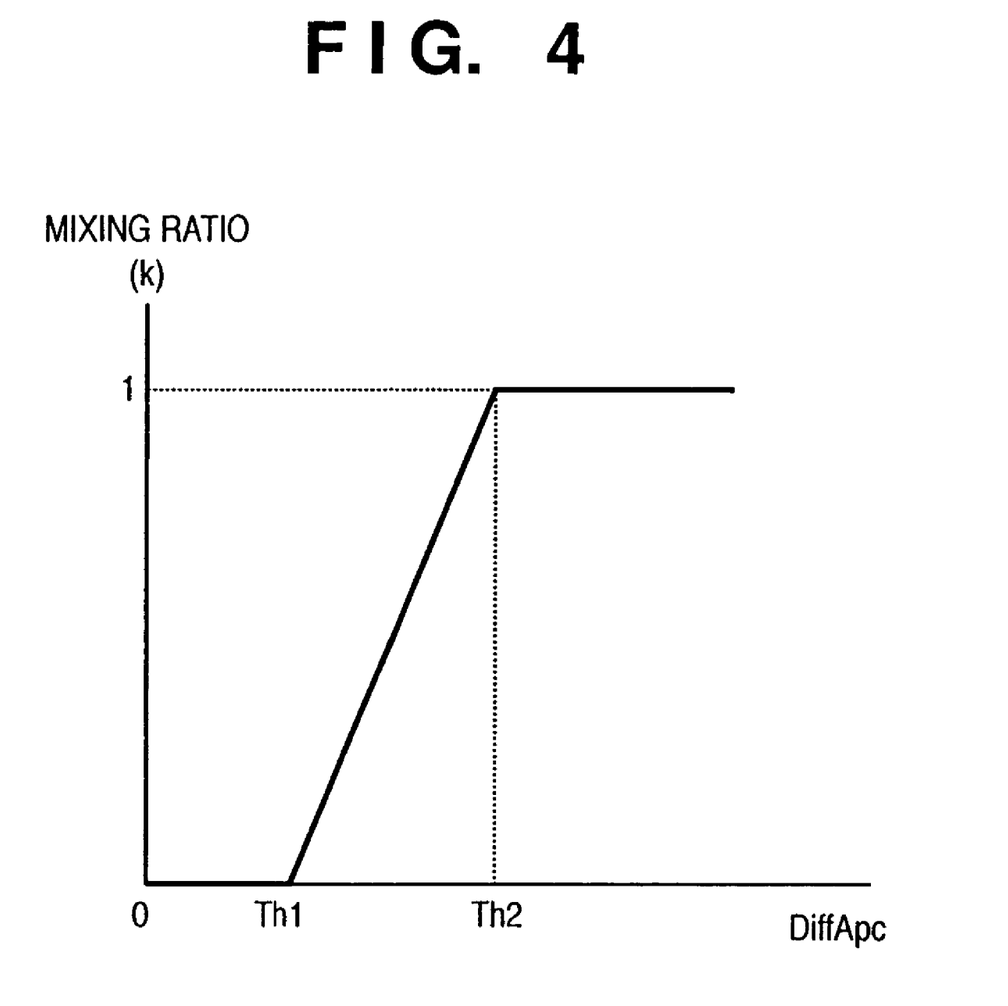
FIG. 4 is a diagram illustrating the setting of a mixing ratio used in calculation of a weighted mean according to the first embodiment.

The rate of use k ($0 \leq k \leq 1$) of Yrapc is calculated using the difference signal DiffApc obtained and a DiffApc-Mix characteristic set in advance (see FIG. 4). The edge signals Ygapc and Yrapc that have been output from the gain circuits 113 and 126 are combined in accordance with the rate of use.

An example of setting of the rate of use k will be described with reference to FIG. 4. When the DiffApc signal is applied as the input, the rate of use (mixing ratio) of the Yrapc signal with respect to DiffApc is obtained at the output. The example of setting shown in FIG. 4 is such that when the DiffApc signal is smaller than a preset threshold value Th1, the amplitude of the Ygapc signal is large and therefore only the edge emphasis signal Ygapc created from the G signal is used. Consequently, the mixing ratio is zero (k=0). On the other hand, if the DiffApc signal is greater than a preset threshold value Th2, only the edge emphasis signal Yrapc created from the R signal is used. Consequently, the mixing ratio is 1 (k=1). When DiffApc is greater than Th1 and less than Th2, the rate of use of Yrapc is gradually increased as DiffApc increases. It should be noted that the mixing ratio may be acquired by retaining the characteristic of FIG. 4 in the form of a look-up table or by substituting the difference value (DiffApc) into a calculation formula. Further, according to the characteristic of FIG. 4, zero is output as is if the difference value DiffApc is less than Th1 (inclusive of negative values).

A weighted-mean circuit 132 calculates the final edge signal (Yapc) by obtaining the weighted mean of Ygapc and Yrapc using the rate of use k of the Yrapc signal. That is, the final edge signal Yapc is obtained according to the following equation:

$$Yapc = Yrapc \times k + Ygapc \times (1-k) \quad (3)$$

The final edge signal Yapc is added to the main luminance signal Ysig, which has been obtained by the luminance signal creating circuit 907 using Equation (1) above, by an adder circuit 133. The latter outputs an edge-emphasized luminance signal Yh.

Thus, the edge emphasizing circuit 908 of the first embodiment is adapted to compare the maximum value in a prescribed area of the edge signal Ygapc calculated from the Yg signal obtained by adaptive interpolation of the G signal and the edge signal Yrapc calculated from the Yr signal obtained by adaptive interpolation of the R signal, and obtains the weighted mean of Ygapc and Yrapc using the difference signal DiffApc between the absolute values of these two signals. In accordance with this arrangement, the blurring of the red-black edge, which is a problem that arises with the conventional edge emphasizing circuit using only the G signal, for example, can be compensated for by the edge signal detected from the R signal, thereby making it possible to avoid the problem of blurring. Further, since the edge signal from the G signal and the edge signal from the R signal can be switched between adaptive in accordance with the color edge of the subject, a major advantage is obtained in terms of noise in comparison with edge detection using all of the R, G, B signals as in the prior art.

Further, though Yr is used in the above embodiment, blurring of a blue-black edge can be eliminated if use is made of the Yb signal, which is obtained by adaptive interpolation of the B signal. (Generally, with an RGB primary-colors sensor presently in general use, the G filter possesses some sensitivity even with respect to the color B and therefore blurring is not as great as that of the red-black line.)

Figure 2:
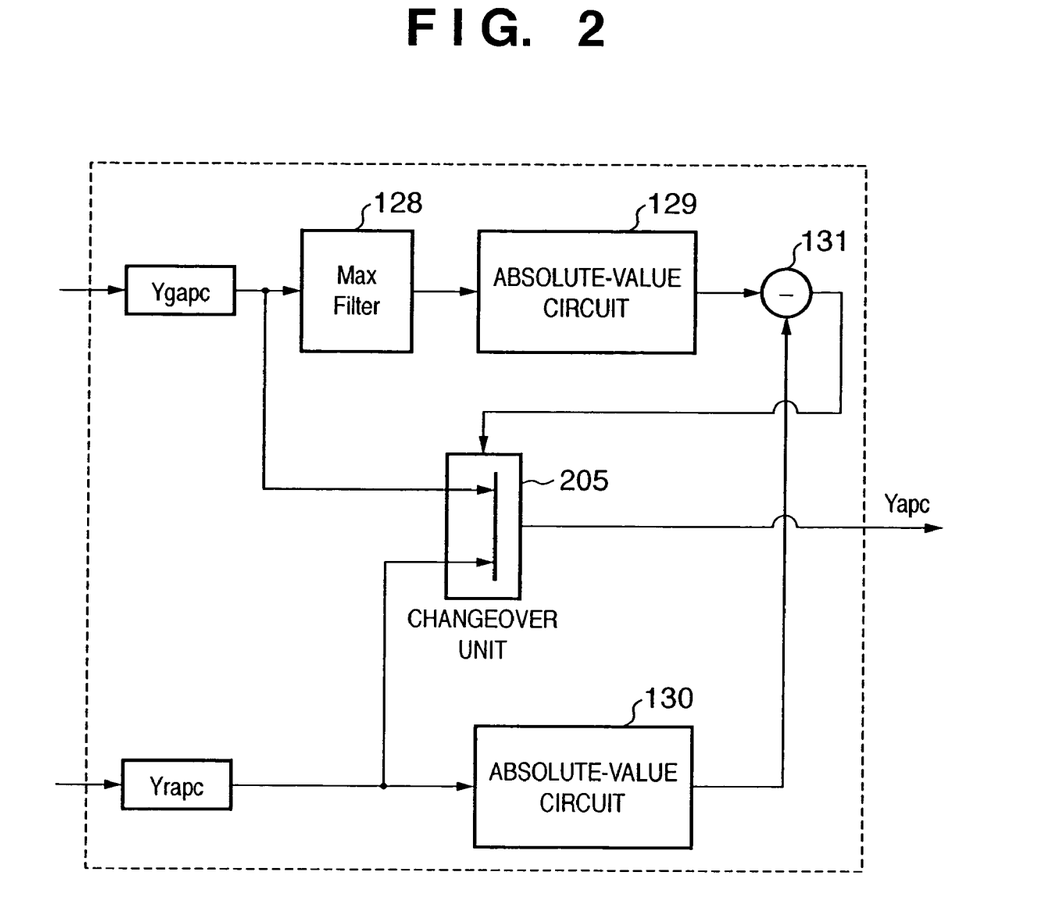
FIG. 2 is a block diagram illustrating a modification of the edge emphasizing circuit according to the first embodiment.

It should be noted that the Ygapc signal and Yrbapc signal may be compared with each other in terms of the magnitudes of their absolute values, and the edge signal having the larger amplitude may be output as the final edge signal Yapc, as shown in FIG. 2. This will be described with reference to FIG. 2.

The edge signal Ygapc, which has been calculated from the Yg signal obtained by adaptive interpolation of the G signal, is directed through the maximum-value filter 128 and the absolute value is obtained by the absolute-value circuit 129. Further, the edge signal Yrapc, which has been calculated from the Yr signal obtained by adaptive interpolation of the R signal, has its absolute value obtained by the absolute-value circuit 130. The difference between the output signals |Yrapc| and |Ygapc| of the absolute-value circuits 129, 130 is calculated by the subtractor 131. Meanwhile, the edge signals Ygapc and Yrapc are input to a changeover unit 205. The latter outputs Yrapc as the final edge signal Yapc if the output (|Yrapc|-|Ygapc|) of the subtractor 131 is positive and outputs Ygapc as the final edge signal Yapc if the output of the subtractor 131 is zero or negative.

In the case of the arrangement shown in FIG. 2, the minute setting of amplitude based upon the weighted mean as in FIG. 1 can no longer be carried out. However, the scale of the circuitry can be reduced and calculation time can be curtailed.

Second Embodiment

In a second embodiment, the edge signal Ygapc calculated from the Yg signal obtained by adaptive interpolation of the G signal, the edge signal Yrapc calculated from the Yr signal obtained by adaptive interpolation of the R signal, and the edge signal Ybapc calculated from the Yb signal obtained by adaptive interpolation of the B signal are compared, and the weighted mean of Ygapc, Yrapc and Ybapc is obtained using difference signals between the absolute values of these signals. In accordance with this arrangement, blurring of the red-black edge or of the blue-black edge, which is a problem that arises with the conventional edge emphasizing circuit using only the G signal, for example, can be compensated for by the edge signal detected from the R signal or B signal.

Figure 3:
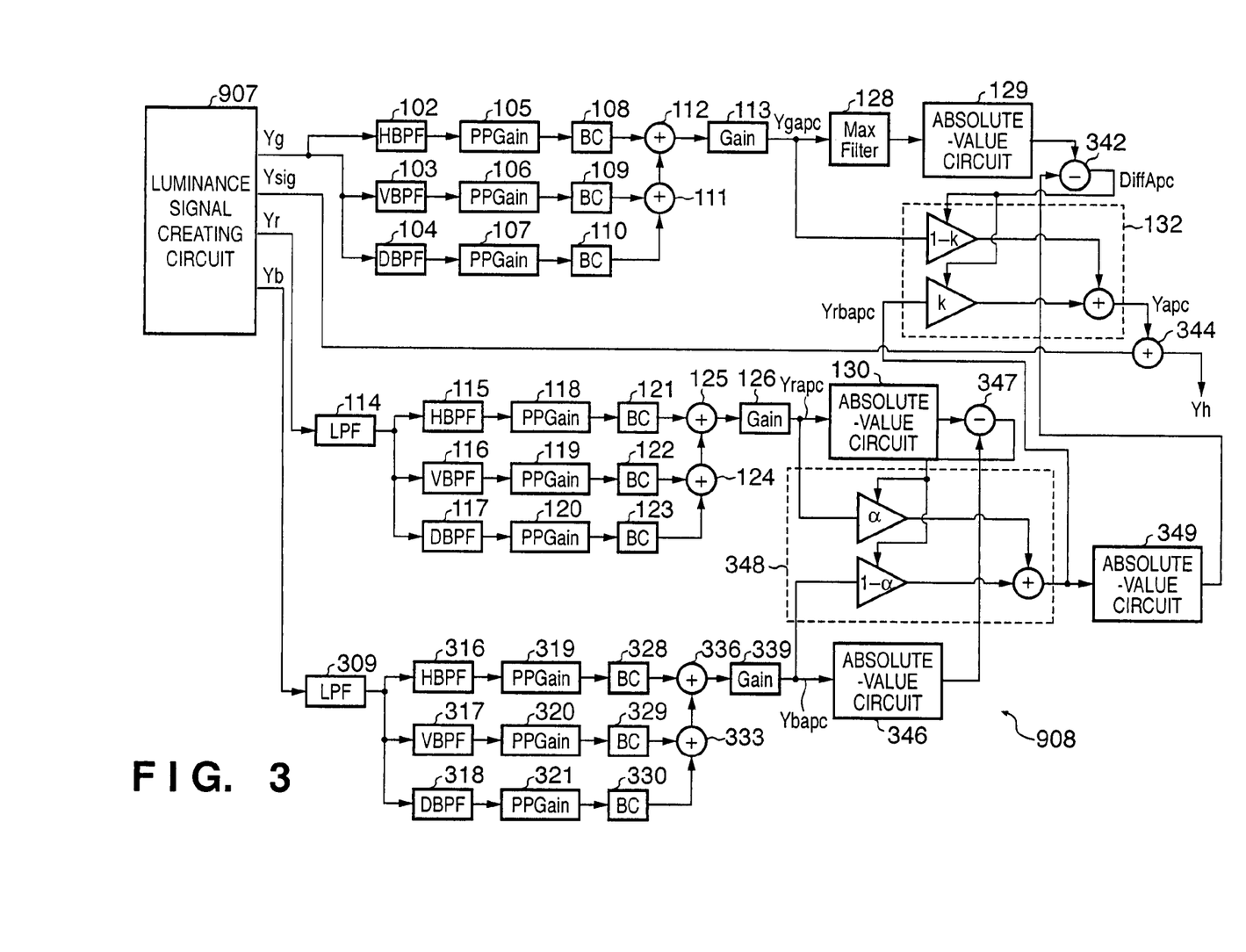
FIG. 3 is a block diagram illustrating the structure of an edge emphasizing circuit according to a second embodiment of the present invention.

Thus, as described above, the second embodiment differs from the first embodiment in that the three R, G, B color signals are used in edge detection. FIG. 3 is a block diagram illustrating the edge detection circuit according to the second embodiment. Here components similar to those of the first embodiment are designated by like reference characters. The luminance signal creating circuit 907 outputs the Yg signal (obtained by adaptive interpolation of the G signal), the Yr signal (obtained by adaptive interpolation of the R signal) and the Yb signal (obtained by adaptive interpolation of the B signal). As described on conjunction with FIG. 1, the Ygapc signal is obtained by the gain circuit 113 from the first high-frequency edge signal Yg, and the second high-frequency edge signal Yrapc is obtained by the gain circuit 126 from the Yr signal.

Similarly, an edge signal is detected from the Yb signal. First, the Yb signal is band-limited by an LPF circuit 309. This is because the B signal is such that the sampling Nyquist frequency is half that of the G signal. The edge signal in the horizontal direction is thenceforth detected by a bandpass filter circuit 316 for detecting high-frequency components in the horizontal direction (HBPF). The detected edge signal is subjected to amplitude adjustment by a PP gain circuit 319 and removal of noise components in a BC circuit 328, after which the resultant signal is output. Similarly, an edge signal in the vertical direction is output by a bandpass filter circuit 317 in the vertical direction (VBPF), a PP gain circuit 320 and a BC circuit 329, and an edge signal in the diagonal direction (DBPF) is output by a bandpass filter circuit 318 in the diagonal direction (DBPF), a PP gain circuit 321 and a BC circuit 330. These edge signals are added by adders 333, 336, and the resultant signal is subjected to a gain adjustment in a gain circuit 339 and then is output as a third high-frequency edge signal Ybapc.

The combining (mixing) of the Ygapc signal, Yrapc signal and Ybapc signal will be described next.

First, the Yrapc signal and Ybapc signal are combined by a weighted-mean circuit 348. The difference between the absolute value of the Yrapc signal that is output from the absolute-value circuit 130 and the absolute value of the Ybapc signal that is output from the absolute-value circuit 346 is obtained by a subtractor 347. That is, the subtractor 347 calculates a difference signal DiffApc_rb as follows:

$$DiffApc\_rb = |Yrapc| - |Ybapc| \quad (4)$$

The weighted-mean circuit 348 calculates the weighted mean of Yrapc and Ybapc based upon a preset Diff-Apc_rb-mixing ratio characteristic in accordance with the following equation:

$$Yrbapc = \alpha \times Yrapc + (1-\alpha) \times Ybapc \quad (5)$$

Figure 5:
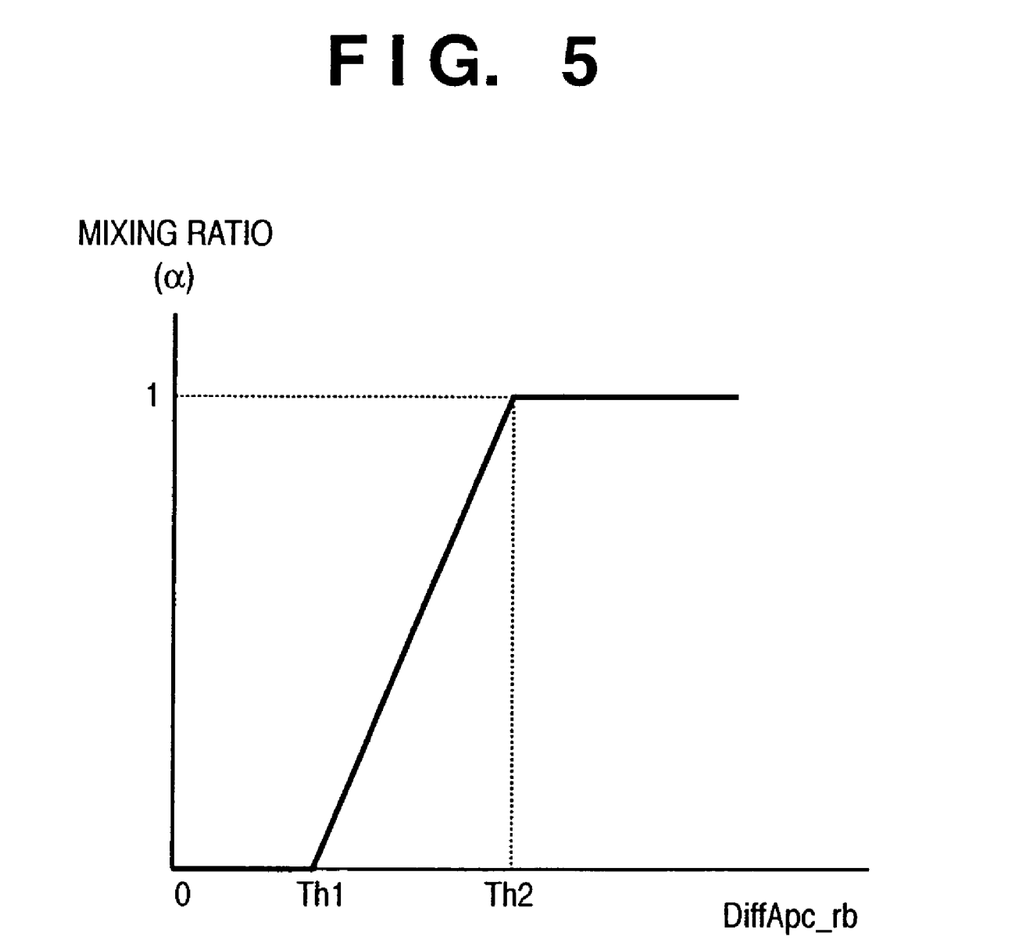
FIG. 5 is a diagram illustrating the setting of a mixing ratio used in calculation of a weighted mean according to the second embodiment.

With reference to FIG. 5, a mixture rate ($\alpha$) of the Yrapc signal with respect to DiffApc_rb is obtained as the output when the DiffApc_rb signal is input. When the DiffApc_rb signal is smaller than a preset threshold value Th1, the amplitude of the Ybapc signal is large and therefore only the edge emphasis signal Ybapc created from the B signal is used. Consequently, the mixing ratio is zero ($\alpha=0$). On the other hand, if the DiffApc_rb signal is greater than a preset threshold value Th2, only the edge emphasis signal Yrapc created from the R signal is used. Consequently, the mixing ratio is 1 ($\alpha=1$). When DiffApc_rb is greater than Th1 and less than Th2, the rate of use ($\alpha$) of Yrapc is gradually increased as DiffApc_rb increases. It should be noted that the mixing ratio may be acquired by retaining the characteristic of FIG. 5 in the form of a look-up table or by substituting the difference value (DiffApc_rb) into a calculation formula. Further, according to the characteristic of FIG. 5, zero is output as is if the difference value DiffApc_rb is less than Th1 (inclusive of negative values).

The combining (mixing) of the Ygapc signal and Yrbapc signal will be described next.

In a manner similar to that of the first embodiment, the Ygapc signal is successively replaced with the maximum pixel values located in an n×n pixel area, the center of which is the pixel of interest, by the maximum-value filter 128. The absolute-value signal obtained by supplying the signal from the maximum-value filter 128 to the absolute-value circuit 129 and the absolute-value signal obtained by supplying the Yrbapc signal to the absolute-value circuit 349 are supplied to the subtractor 342, whereby the difference signal DiffApc ($|Yrapc|-|Ygapc|$) is obtained. The weighted-mean circuit 132 obtains the weighted mean using this difference signal and preset DiffApc-mixing ratio characteristic (see FIG. 4) as follows:

$$Yapc = k \times Yrbapc + (1-k) \times Ybapc \quad (6)$$

Thereafter, in a manner similar to that of the first embodiment, the main luminance signal Ysig from the adaptive interpolation circuit and the final edge signal Yapc are added. That is, the edge-emphasized luminance signal Yh is obtained according to the following equation:

$$Yh = Ysig + Yapc \quad (7)$$

Thus, the edge emphasizing circuit of the first embodiment is adapted to compare the edge signal Ygapc calculated from the Yg signal obtained by adaptive interpolation of the G signal, the edge signal Yrapc calculated from the Yr signal obtained by adaptive interpolation of the R signal, and the edge signal Ybapc calculated from the Yb signal obtained by adaptive interpolation of the B signal, and to obtain the weighted mean of Ygapc, Yrapc and Ybapc using difference signals between the absolute values of these signals. In accordance with this arrangement, blurring of the red-black edge or of the blue-black edge, for example, can be compensated for by the edge signal detected from the R signal or B signal, and it is possible to avoid the problem of the conventional edge emphasizing circuit that uses only the G signal.

Further, as described with reference to FIG. 2 of the first embodiment, the absolute-values of the Ygapc signal, Yrapc signal and Ybapc signal may be compared in terms of their magnitudes, and the edge signal having the largest amplitude may be output as the final edge signal Yapc. In this case, the minute setting of amplitude based upon the weighted mean can no longer be carried out. However, the scale of the circuitry can be reduced and calculation time can be curtailed. It should be noted that the circuit arrangement can be implemented by replacing the weighted-mean circuits 132, 348 of FIG. 3 with the circuit arrangement shown in FIG. 2, by way of example.

Third Embodiment

In the first embodiment, the final edge signal Yapc is generated by obtaining the weighted mean of each of the edge signals based upon the difference between edge signals calculated from the Yg signal obtained by adaptive interpolation of the G signal and the Yr signal obtained by adaptive interpolation of the R signal.

In a third embodiment, processing is executed for creating luminance signal Y, which is for use in edge-signal detection, by calculating the weighted mean from Yr and Yg signals output from the adaptive interpolation circuit, and then adaptively changing over the color-composition ratio at this time according to the color of the subject. Adopting this arrangement avoids blurring of the red-black edge, which is a problem encountered with the conventional edge emphasizing circuit that uses only the G signal.

Figure 6:
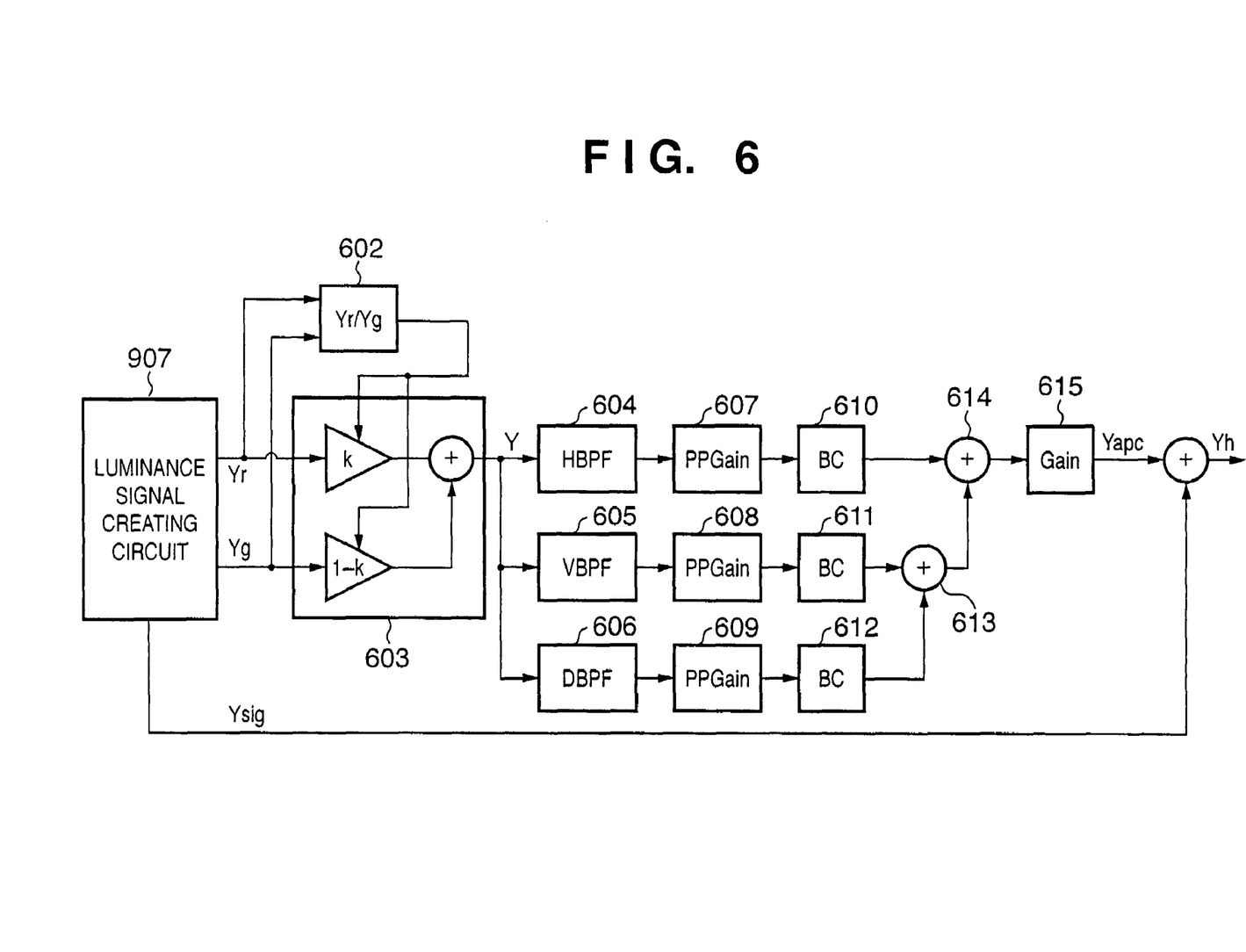
FIG. 6 is a block diagram illustrating the structure of an edge emphasizing circuit according to a third embodiment of the present invention.

In the third embodiment, the RGB composition ratio is changed adaptively in accordance with the color of the subject when the Y signal used in edge detection is created. FIG. 6 is a block diagram illustrating the edge emphasizing circuit 908 according to the third embodiment. Operation will be described below with reference to FIG. 6.

The R and G signals from adaptive interpolation are calculated by a dividing circuit 602 according to the following equation:

$$Hue = Yr/Yg \quad (8)$$

Figure 7:
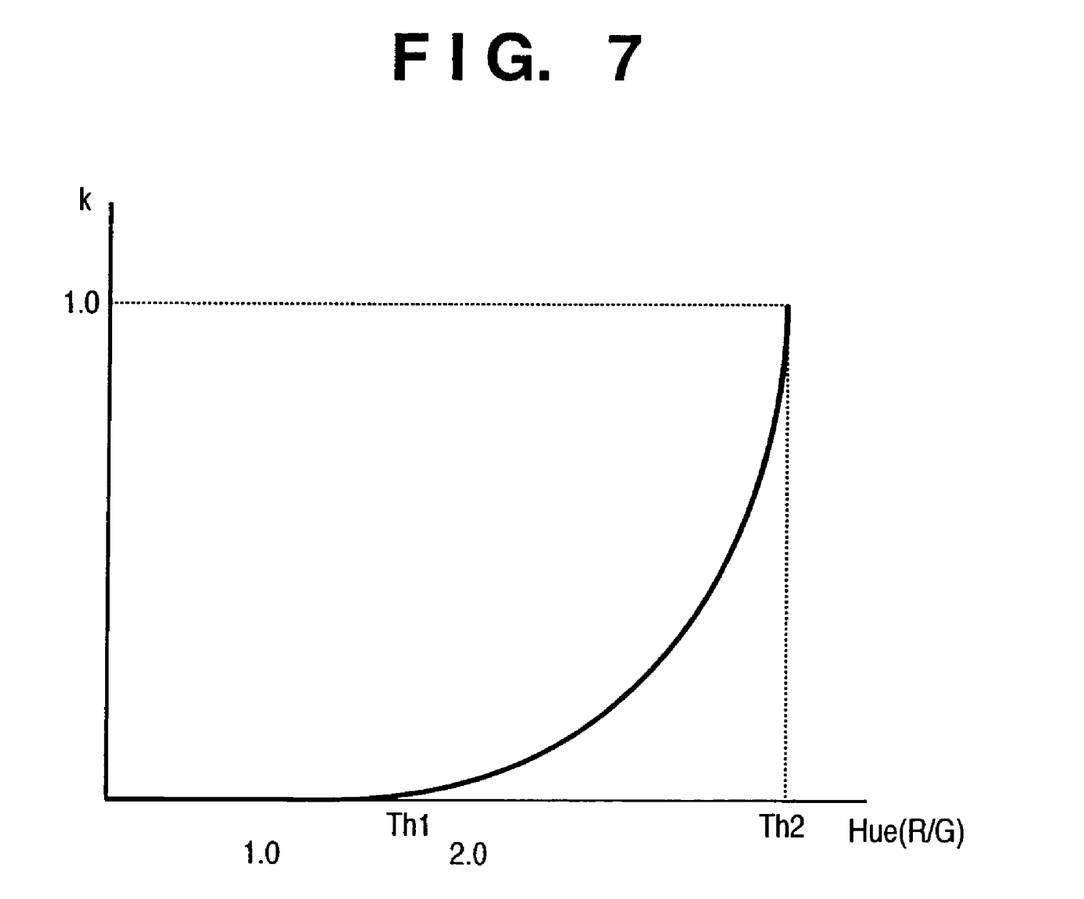
FIG. 7 is a diagram illustrating the setting of a mixing ratio used in calculation of a weighted mean according to the third embodiment.

This is followed by calculating the rate of use k of the R signal using a preset Hue-mixing ratio calculation characteristic (see FIG. 7).

As shown in FIG. 7, the Hue-mixing ratio calculation characteristic is a characteristic curve which, when a hue signal is input, is for outputting the mixing ratio k of the R-signal with respect to the hue signal. When the hue signal is smaller than a preset threshold value Th1, the amplitude of the G signal of the R and G signals in the subject is larger and therefore the mixing ratio k is made zero (k=0) in order that use is made only of the adaptive interpolation signal Yg of the G signal as the luminance signal for detecting the edge component. On the other hand, when the hue signal is smaller than a preset threshold value Th2, the mixing ratio k is made one (k=1) in order that use is made only of the adaptive interpolation signal Yr of the R signal. When the hue signal is greater than Th1 and less than Th2, the rate of use of the adaptive interpolation signal of the R signal is gradually increased as the hue signal increases. It should be noted that the mixing ratio may be acquired by retaining the characteristic of FIG. 7 in the form of a look-up table or by substituting the value of the hue signal into a calculation formula.

Using the above-mentioned mixing ratio k, the limit-capacity specifying processor 603 calculates the luminance signal Y, which is used in edge-signal detection, according to the following equation:

$$Y = k \times Yr + (1-k) \times Yg \quad (9)$$

The edge signal detection processing from this point onward is similar to the ordinary edge signal detection processing described above with reference to FIG. 9.

Thus, in accordance with the third embodiment, processing is executed for creating luminance signal Y, which is for use in edge-signal detection, by calculating the weighted mean from Yr and Yg signals output from the adaptive interpolation circuit, and then adaptively changing over the color-composition ratio at this time according to the color of the subject. As a result, since the component of the R adaptive signal is included in case of a red subject, it is possible to avoid blurring of the red-black edge, which is a problem with the conventional edge emphasizing circuit that uses only the G signal.

It should be noted that in order to simplify the description, the third embodiment has been described with regard to an edge-detection luminance signal creating method based upon mixing of the adaptive interpolation outputs Yr, Yg of the R and G signals, which are the most effective. However, the mixing ratio of the three signals R, G, B may be changed in accordance with the color of the subject. Further, the luminance signal for edge detection may be generated by mixing of the B and G signals.

Thus, in accordance with the third embodiment, processing is executed for creating luminance signal Y, which is for use in edge-signal detection, by calculating the weighted mean from R and G signals output from the adaptive interpolation circuit, and changing over the weighting ratio at this time according to the color of the subject. As a result, since the component of the R adaptive signal is included in case of a red subject, it is possible to avoid blurring of the red-black edge, which is a problem with the conventional edge emphasizing circuit that uses only the G signal.

Thus, in accordance with the present invention, excellent edge emphasis becomes possible irrespective of the color of the subject.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-341964 filed on Sep. 30, 2003, which is hereby incorporated by reference herein.

What is claimed is:

1. A signal processing apparatus comprising:
   a first unit configured to generate a first high-frequency signal using a luminance signal of a green color component in a video signal;
   a second unit configured to generate a second high-frequency signal using a luminance signal of a color component other than the green color component in the video signal; and
   a generating unit configured to generate a high-frequency signal for edge emphasizing processing by combining the first and second high-frequency signals at a ratio corresponding to a size relationship between the first and second high-frequency signals.

2. The apparatus according to claim 1, further comprising an edge emphasizing unit configured to execute edge emphasizing processing of the luminance signals, which are obtained from the video signal, using the high-frequency signal generated by said generating unit.

3. The apparatus according to claim 1, wherein said generating unit decides a mixing ratio between the first high-frequency signal and the second high-frequency signal based upon the difference between an absolute value of the first high-frequency signal and an absolute value of the second high-frequency signal and calculates the weighted mean of the first high-frequency signal and second high-frequency signal using the mixing ratio, thereby obtaining the high-frequency signal for edge emphasizing processing.

4. The apparatus according to claim 1, wherein said generating unit compares an absolute value of the first high-frequency signal and an absolute value of the second high-frequency signal and adopts the high-frequency signal having the larger absolute value as the high-frequency signal for edge emphasizing processing.

5. The apparatus according to claim 1, wherein said generating unit generates the second high-frequency signal based upon a luminance signal of a red or blue color component in the video signal.

6. The apparatus according to claim 1 wherein said first generating unit generates green high-frequency signals using luminance signals of green components in the video signal;

said second unit generates red or blue high-frequency signals using luminance signals of red or blue components in the video signal; and said generating unit generates the high-frequency signal for edge emphasizing processing using a size relationship between the green and red high-frequency signals or between the green and blue high-frequency signals.

7. The apparatus according to claim 6, wherein said second unit generates both red and blue high-frequency signals using luminance signals of red and blue components in the video signal respectively, and said generating unit:

decides a mixing ratio between the red high-frequency signal and the blue high-frequency signal based upon the difference between an absolute value of the red high-frequency signal and an absolute value of the blue high-frequency signal and calculates the weighted mean of the red and blue high-frequency signals using the mixing ratio, thereby obtaining a third high-frequency signal; and decides a mixing ratio between the third high-frequency signal and the green high-frequency signal based upon the difference between an absolute value of the third high-frequency signal and an absolute value of the green high-frequency signal and calculates the weighted mean of the third high-frequency signal and green high-frequency signal using the mixing ratio, thereby generating the high-frequency signal for edge emphasizing processing.

8. The apparatus according to claim 6, wherein said second generating unit adopts, as the high-frequency signal for edge emphasizing processing, whichever of the green and red high-frequency signals has the largest absolute value or whichever of the green and blue high-frequency signals has the largest absolute value.

9. A signal processing method comprising the steps of:

generating a first high-frequency signal using a luminance signal of a green color component in a video signal;

generating a second high-frequency signal using a luminance signal of a color component other than the green color component in the video signal; and generating a high-frequency signal for edge emphasizing processing by combining the first and second high-frequency signals at a ratio corresponding to a size relationship between the first and second high-frequency signals.

10. The method according to claim 9, further comprising a step of executing edge emphasizing processing of the luminance signals, which are obtained from the video signal, using the high-frequency signal for edge emphasizing processing.

11. An image sensor comprising:

a color difference generating unit configured to generate color difference signal from a video signal;

a luminance signal generating unit configured to obtain a luminance signal, which has been edge-emphasized by the signal processing apparatus set forth in any one claims 2 to 8, from the video signal; and an output unit configured to generate and output a video signal using the color difference signals and luminance signal.

* * * * *